(12) United States Patent
Senor et al.

(10) Patent No.: US 6,426,476 B1
(45) Date of Patent: Jul. 30, 2002

(54) LAMINATED RARE EARTH STRUCTURE AND METHOD OF MAKING

(75) Inventors: David J. Senor, West Richland; Roger N. Johnson, Richland; Bruce D. Reid, Pasco; Edward F. Love, Jr., West Richland; Sandra Larson; Andrew W. Prichard, both of Richland, all of WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 09/620,407

(22) Filed: Jul. 20, 2000

(51) Int. Cl.$^7$ ............................................. B23K 28/00
(52) U.S. Cl. ................................................... 219/76.13
(58) Field of Search ............................ 219/76.13; 427/6

(56) References Cited

U.S. PATENT DOCUMENTS

| | | | |
|---|---|---|---|
| 4,346,281 A | | 8/1982 | Inoue ...................... 219/76.13 |
| 4,649,086 A | | 3/1987 | Johnson ...................... 428/627 |
| 4,728,488 A | * | 3/1988 | Gillett et al. |
| 4,780,268 A | | 10/1988 | Papai et al. .................. 376/272 |
| 5,071,059 A | * | 12/1991 | Heitman et al. |
| 5,102,031 A | * | 4/1992 | Heitman et al. |
| 5,190,598 A | * | 3/1993 | Qureshi |
| 5,241,571 A | | 8/1993 | Pati et al. .................... 376/260 |
| 5,267,290 A | | 11/1993 | Corsetti et al. ............. 376/419 |
| 5,615,238 A | * | 3/1997 | Wiencek et al. |
| 5,872,826 A | | 2/1999 | Fujieda et al. .............. 376/447 |
| 6,160,862 A | * | 12/2000 | Wiencek et al. |
| 6,336,950 B1 | * | 1/2001 | Koizumi et al. |

FOREIGN PATENT DOCUMENTS

| | | | |
|---|---|---|---|
| EP | 0 192 880 | 10/1985 | .................... 35/32 |
| EP | 0192880 A1 | * 9/1986 | |
| EP | 0 225 089 | 11/1986 | ...................... 7/10 |
| EP | 0225089 A1 | * 6/1987 | |
| EP | 0 439 002 | 1/1991 | ...................... 3/18 |
| EP | 0503698 A1 | * 9/1992 | |
| EP | 0 817 203 | 6/1997 | .................... 3/324 |

OTHER PUBLICATIONS

RN Johnson, "Principles and Applications of Electro-Spark", p. 189–213. 1988.

* cited by examiner

Primary Examiner—Tom Dunn
Assistant Examiner—Kiley Stoner
(74) Attorney, Agent, or Firm—Stephen R. May (57) ABSTRACT

A laminated structure having two or more layers, wherein at least one layer is a metal substrate and at least one other layer is a coating comprising at least one rare earth element. For structures having more than two layers, the coating and metal substrate layers alternate. In one embodiment of the invention, the structure is a two-layer laminate having a rare earth coating electrospark deposited onto a metal substrate. In another embodiment of the invention, the structure is a three-layer laminate having the rare earth coating electrospark deposited onto a first metal substrate and the coating subsequently abonded to a second metal substrate. The bonding of the coating to the second metal substrate may be accomplished by hot pressing, hot rolling, high deformation rate processing, or combinations thereof. The laminated structure may be used in nuclear components where reactivity control or neutron absorption is desired and in non-nuclear applications such as magnetic and superconducting films.

16 Claims, 8 Drawing Sheets

LAMINATED RARE EARTH STRUCTURE AND METHOD OF MAKING

This invention was made with Government support under Contract DE-AC0676RLO1830 awarded by the U.S. Department of Energy. The Government has certain rights in the invention.

FIELD OF THE INVENTION

This invention relates generally to a laminated article of manufacture and a method of making wherein at least one layer of the laminate comprises at least one rare earth element. More particularly, this invention relates to electrospark depositing a rare earth coating on a metal substrate wherein the coating may be subsequently bonded to another metal substrate. Still more particularly, this invention relates to electrospark depositing the rare earth element erbium on a zirconium alloy substrate that can be subsequently formed into a fuel assembly component for neutronic control in a light water reactor. "Laminated" herein is defined as composed of layers of metallurgically-bonded material with at least one substrate layer and at least one coating layer. "Rare earth" element is defined in the conventional manner, that is, an element of the lanthanide series.

BACKGROUND OF THE INVENTION

The operation of a nuclear power plant requires that the reactor core maintain criticality throughout the duration of its operating cycle. In order to operate for an extended period of time, the reactor core must initially have excess reactivity (i.e., an excess amount of fissile material). This excess reactivity changes over time such that by the end of its operating cycle, the excess reactivity approaches zero, and the reactor core can no longer remain critical. At this point, the reactor is shut down and the core is refueled.

The amount of excess reactivity in a reactor core is limited to maintain a safe, controlled nuclear chain reaction. The primary method of reactivity control is to fuel the reactor core with a number of fuel "batches," each batch generally having been operated a cycle more than the succeeding batch. Ideally, the reactivity of each batch would be designed such that the average of the whole core allows the core to be just critical. When a particular fuel batch does not have sufficient reactivity to meaningfully contribute to the excess reactivity of another fuel cycle, the batch is discharged to the spent fuel pool and a fresh fuel batch takes its place.

Because fresh fuel must typically last for ~1200–2000 effective full power days in the reactor (depending on the particular cycle design), fresh fuel must be loaded with far more reactivity than would be required if the fresh fuel only needed to last for 1 cycle. These high levels of excess reactivity require design measures to maintain the reactor core within acceptable safety margins. One of these design measures is the incorporation of a burnable neutron absorption material (sometimes called "burnable poison," referred to hereinafter as simply "absorber") within the fuel assemblies that provide "negative" reactivity to the batch in an amount that is able to help control the excess reactivity as the reactor cycle proceeds (U.S. Pat. No. 5,241,571, No. 5,267,290, and No. 5,872,826, referred to hereinafter as patents '571, '290, and '826, respectively).

Absorbers typically comprise one or more of the following high neutron absorption cross-section elements: boron, cadmium, silver, indium, hafnium, and the rare earth elements of gadolinium, erbium, and samarium. Some of these absorbers have been incorporated in "discrete" absorber pins that occupy fuel pin lattice positions in a fuel assembly, as a coating on fuel pellets, as a constituent of the fuel, and as an alloying element of a component of the fuel assembly (e.g., fuel cladding or structural members). All of these methods, however, have shortcomings. For example, discrete absorber pins and absorber-containing fuel displace power-producing fuel, operate at lower linear heat generation rates than standard fuel pins, and require more stringent controls in material handling and fabrication during fuel assembly manufacture. Furthermore, the alloying approach restricts the range of options available to the designer for choosing the optimum amount and spatial distribution of the absorber within the fuel assembly component to meet reactivity needs.

A more attractive and versatile approach is provided by patent '826 which discloses a fuel assembly design comprising absorbers as sheets that are embedded in the structural channel box of a fuel assembly using a variety of encapsulation, rolling, and pressing techniques. Such an approach provides flexibility in the amount and location of the absorber within the fuel assembly and keeps the absorber from directly contacting the reactor coolant. In addition, this approach offers a method to increase fuel burnup. By replacing the absorber-containing structural member (e.g., guide tube, channel, duct) of a fuel assembly during a reactor shutdown with another member containing a lower amount of absorber (without replacing the fuel pins) and reinserting the assembly in the reactor, fuel lifetime can be increased. The absorber sheets disclosed in patent '826 were made of cadmium, samarium, boron, gadolinium, silver, indium and hafnium.

An optimum reactivity profile for each fuel assembly would be one that has a flat reactivity curve throughout its life and then drops off to zero just prior to the assembly being discharged. Practically, this would require that the negative reactivity of the absorber in the assembly burn out at exactly the same rate as the fissile fuel, and that all of the absorber is depleted at the end of the cycle. Any absorber that remains at the end of the life of the fuel assembly contributes to a residual negative reactivity that can shorten assembly (and therefore core) life. In practice, it is very difficult to achieve a flat reactivity curve with no absorber left at the end of assembly life. Each absorber has its own nuclear characteristics, and every reload batch is a compromise between competing alternatives.

In this regard, the designer has two considerations to achieve the compromise in designing a core load. First, any residual negative reactivity from absorber that remains at the end of assembly life results in a loss of economic value of the assembly. There is no way to mitigate the presence of residual negative reactivity except to add more fissile material to the initial fuel load. Clearly, the best designs would minimize residual negative reactivity. Second, the amount of fuel assembly excess reactivity controlled by the absorber during the life of the assembly may be highly variable. This is because there are a variety of methods that can be used to control overall core reactivity, including control rods, water flow, etc. In addition, there is generally sufficient thermal margin in fuel designs to allow reasonably wide assembly power/reactivity swings (~25%) through the life of the assembly. However, there are limits to what can be accommodated from a safety standpoint in a core design. It is clear, however, that it would be more economically desirable to design an assembly that has larger swings in reactivity than a large amount of residual negative reactivity.

Figure 1:
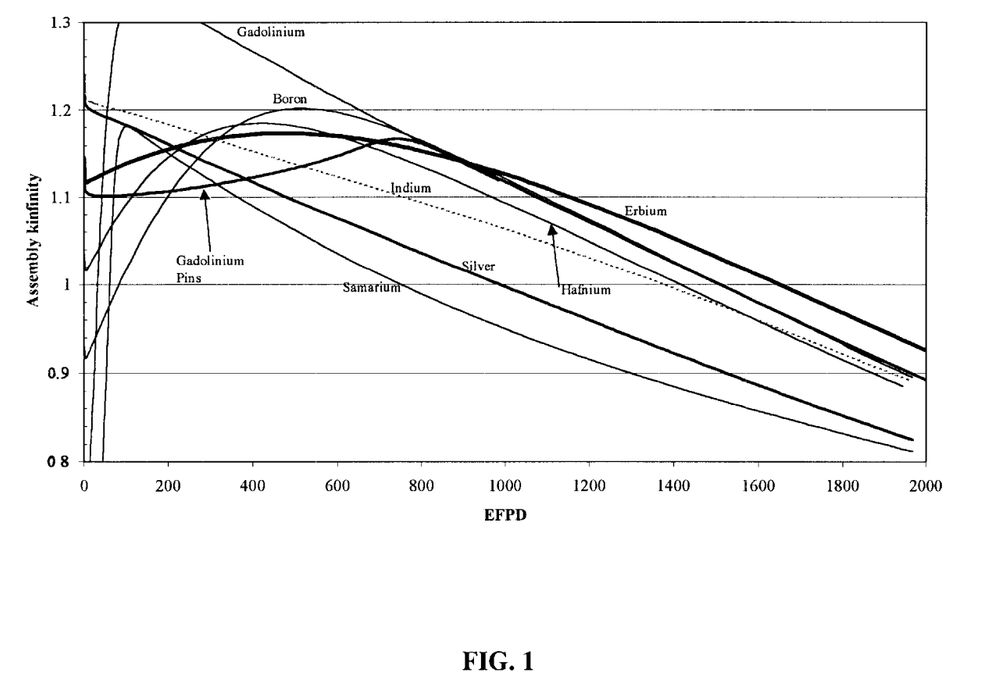
FIG. 1 is a graph comparing the predicted in-reactor performance of various absorbers.

FIG. 1 provides a graphical comparison of some reactivity calculations for several sample fuel assembly designs containing a variety of absorbers. The "Gadolinium Pins" curve is the baseline curve representing a fuel assembly designed with gadolinium mixed with fuel in several fuel pins in the assembly. This design represents the current state of the art of absorber application in boiling water reactors (BWRs). Fuel pins with gadolinium have been used for a number of years, and has provided a reasonable balance of reactivity and residual negative reactivity. The other curves shown in FIG. 1 use an absorber incorporated in the structural member of the fuel assembly. As discussed previously, incorporation of the absorber in a structural member (as an non-alloying element) has advantages over other approaches.

The common basis for each curve in FIG. 1 is that each absorber analyzed is placed in an assembly with the same initial amount of U-235. The amount of absorber is adjusted to try to obtain a reactivity curve that is as constant as possible with a peak reactivity of <1.2 and a minimum reactivity >0.9. Therefore, the reactivity potential of each of the sample assemblies calculated is exactly the same. The figure clearly shows the differences that can be achieved with the different absorbers.

The use of samarium, hafnium, indium or silver, as suggested by patent '826, would not meet the economic requirements of a fuel assembly with minimal residual reactivity. As can be seen in FIG. 1, samarium and silver clearly result in a significant residual reactivity penalty as compared to the baseline. Samarium also has the additional disadvantage of having a very large increase in reactivity at the beginning of operation, which could potentially result in operational difficulty in maintaining safety margins. Hafnium and indium are much better for this application, however, there is still a penalty relative to the baseline. The penalty would result in tens of days less operation, which would be associated with a significant cost penalty. Given the penalty of using hafnium or indium in comparison with the state of the art, there would be little economic advantage to incorporating hafnium or indium in the channel.

The incorporation of boron into the structural member, also suggested by patent '826, would be an adequate absorber from the standpoint of residual reactivity worth. The residual reactivity at 2000 days is quite similar to the baseline. However, the reactivity fluctuations are relatively large in the first 800 days. The large fluctuation may be difficult to accommodate safely during operations. In comparison to the baseline, the use of boron would provide little operational advantage, and may make operations more difficult. Because of this, there would be no clear reason that the use of boron in the structural member would be better than the state of the art. Furthermore, boron produces helium as a result of neutron capture and may result in degradation of the structural integrity of the assembly.

As shown in FIG. 1, the use of erbium (Er) results in a relatively smooth reactivity curve. The initial and peak reactivities are similar to the baseline, however the curve is much flatter than the baseline through 800 days. This would likely result in fuel assembly designs that can maintain the safety and thermal margins that are in the current gadolinium assemblies. The real reactivity benefit, however, can be seen after 800 days when it becomes clear that the residual negative reactivity component is much less than the baseline. The cycle benefit may be on the order of 150–200 days, which could be directly transferred into fuel cycle savings either through a reduced initial enrichment requirement or through longer operating cycles. Depending on the specific neutronic requirements, further benefits may be obtained by combining the Er with other absorbers.

Support for the use of Er as the absorber is further provided by patents '571 and '290. Patent '571 discloses Er as an alloying element for the zirconium-based fuel cladding or structural member of the fuel assembly. Patent '290 discloses a coextruded fuel pin cladding having a layer of zirconium absorber alloy containing Er. Despite these positive developments in the use of Er, the approaches disclosed in patents '571 and '290 still have some of the shortcomings discussed earlier. It is of interest that the more attractive and versatile approach of incorporating the absorber as an embedded sheet in a structural member (patent '826) does not teach or even suggest the use of Er.

Accordingly, there is a continuing need to incorporate an effective absorber, such as the rare earth element Er, in a structural member of the fuel assembly that overcomes the shortcomings of present methods and that improves the performance of fuel assemblies.

SUMMARY OF THE INVENTION

The present invention is a laminated article of manufacture and a method of making. The article is a structure having two or more layers, wherein at least one layer is a metal substrate and at least one other layer is a coating comprising at least one rare earth element. For structures having more than two layers, the coating and metal substrate layers alternate. In the simplest embodiment of the invention, the structure is a two-layer laminate consisting of a metal substrate (as the first layer) and a coating (as the second layer) formed on the metal substrate. The coating is formed by electrospark depositing a material on the metal substrate from an electrode comprising at least one rare earth element. In a slightly more complex embodiment of the invention, the structure is a three-layer laminate made from a two-layer laminate by the additional step of bonding a second metal substrate to the coating layer. The substrates may be any metal though reactor-grade zirconium-based alloys, iron-based alloys, and nickel-based alloys are preferred for in-reactor nuclear applications such as fuel assembly or fuel storage components. The bonding of the coating to the second metal substrate may be accomplished by hot pressing, hot rolling, high deformation rate processing (e.g., explosive bonding), or combinations thereof.

In view of the foregoing, it is an object of the present invention to bond at least one rare earth to a substrate that can be subsequently mechanically formed into a structure without flaws such as pores, cracks, or delaminations.

It is a further object of the present invention to form a laminate having a sandwiched rare earth layer that can subsequently be cold worked or hot worked while maintaining structural integrity.

It is a further object of the present invention to form a laminate having a sandwiched rare earth layer wherein the rare earth is immobile.

It is a further object of the present invention to form a low-cost, robust, and damage resistant laminate that is useful in applications requiring rare earth films.

It is a further object of the present invention to electrospark deposit material comprising Er on a zirconium alloy substrate that can be subsequently formed into a neutronic control structure for a light water reactor.

It is a further object of the present invention to increase the performance of fuel pins while maintaining or increasing the margin of safety associated with corrosion of a fuel assembly comprising the structure.

It is a further object of the present invention to increase the performance of fuel pins while maintaining or increasing the margin of safety associated with the structural integrity of a fuel assembly.

It is a further object of the present invention to decrease the handling and material control requirements during fuel assembly fabrication.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4b is a composition profile of the electrospark-deposited Er coating shown in FIG. 4a;

FIG. 4c is a hardness (Vickers microhardness, 10 g load) profile for the Er coating shown in FIG. 4a;

FIG. 5b is a composition profile of the Zr-overcoated Er coating shown in FIG. 5a;

DETAILED DESCRIPTION OF THE INVENTION

The present invention is a laminated article of manufacture and a method of making. The article is a structure having two or more layers, wherein at least one layer is a metal substrate and at least one other layer is a coating comprising at least one rare earth element. For structures having more than two layers, the coating and metal substrate layers alternate. The structure would be useful in in-core or out-of-core nuclear components where reactivity control or neutron absorption is desired. In-core components include, but are not limited to, guide tubes/thimbles in pressurized water reactors (PWRs) and channels in BWRs. Out-of-core or out-of-reactor components include, but are not limited to, fissile material storage components such as fissile feedstock containers, green/spent fuel storage racks or fixtures, and green/spent fuel assembly transportation and storage canisters/casks. The structure would also be useful in non-nuclear applications that exploit the special chemical and physical properties of the rare earths (e.g., magnetic and superconducting films).

Though the following three embodiments illustrate a laminate of up to 5 layers, the present invention is not limited to these numbers of layers or these combinations of layer compositions. It will be apparent to those skilled in the art, that other numbers of layers and other combinations of layer compositions may be required to meet certain nuclear or other operational requirements of a specific rare earth application.

Figure 2A:
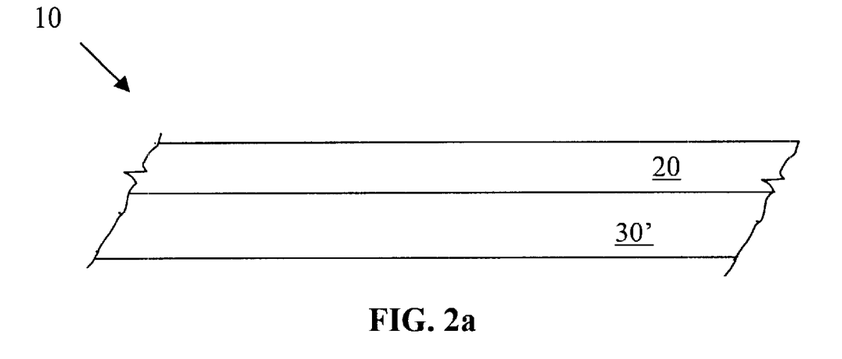
FIG. 2a is an illustration of the first embodiment of the invention.

In the first embodiment of the invention, shown in FIG. 2a, the structure 10 is a two-layer laminate consisting of a coating 20 on a first metal substrate 30'. The coating 20 is formed by the process of electrospark-depositing a first material on the first metal substrate 30' from a first electrode comprising at least one rare earth element, preferably containing Er for neutronic control applications. It is preferred that the electrospark deposition comprises the step of rotating the first electrode while rastering the first electrode across the first metal substrate 30' while depositing the first material from the first electrode onto the first metal substrate 30' through the plasma arc. Rastering of the first electrode over the first metal substrate 30' provides efficient and thorough electrospark-depositing of the coating 20 in a single pass. Rotating, oscillating, or vibrating the first electrode helps prevent the electrode from welding itself to the surface. Depending on the specific application, the electrode may comprise a combination of rare earth elements (e.g., Er and Gd for neutronic applications). As known to those skilled in the art, the required percentage of rare earths in the electrode will depend on the desired deposition amount in the specific application. As also known to those skilled in the art, fewer electrospark deposit passes will be required to deposit a given amount of rare earth the higher rare earth content in the electrode.

The first metal substrate 30' may be any conductive metal. In nuclear applications, it is preferred that the first metal substrate 30' is selected from the group of nuclear-grade zirconium-based alloys, iron-based alloys, and nickel-based alloys. For light water reactor applications (e.g., component in a fuel assembly), it is preferred that the first metal substrate 30' is selected from the group of reactor-grade zirconium alloys including Zr—Sn alloys (e.g., UNS alloys R60802 [Zircaloy-2] and R60804 [Zircaloy-4]), Zr—Nb alloys (e.g., R60901), derivatives thereof, or combinations thereof (i.e., Zr—Sn—Nb alloys). This embodiment would be useful in applications whereby it is acceptable to expose the coating 20 to the environment (e.g., in some fissile material storage applications).

Figure 2B:
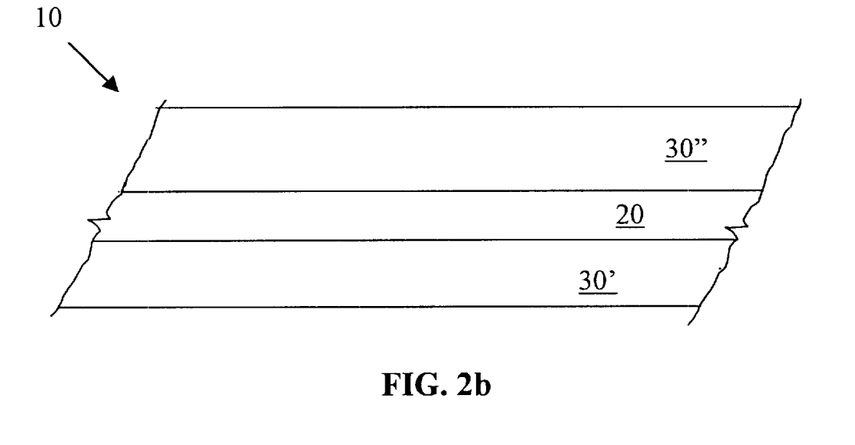
FIG. 2b is an illustration of the second embodiment of the invention.

In the second embodiment of the invention, shown in FIG. 2b, the structure 10 builds upon the two-layer embodiment shown in FIG. 2a by the addition of another layer. The laminate consists of the coating 20 on a first metal substrate 30' with a second metal substrate 30" bonded to the coating 20. Like the first metal substrate 30', the second metal substrate 30" may be any conductive metal. In nuclear applications, it is preferred that the second metal substrate 30" is selected from the group of nuclear-grade zirconium-based alloys, iron-based alloys, and nickel-based alloys. For light water reactor applications (e.g., component in a fuel assembly), it is preferred that the second metal substrate 30" is selected from the group of reactor-grade zirconium alloys including Zr—Sn alloys (e.g., UNS alloys R60802 and R60804), Zr—Nb alloys (e.g., R60901), derivatives thereof, or combinations thereof (i.e., Zr—Sn—Nb alloys). In this embodiment, the second substrate 30" may be made out of the same, or different, material as that of the first substrate 30'. Furthermore, the coating 20 may also be formed by the process of electrospark-depositing a first material onto the first metal substrate 30' from a first electrode comprising a rare earth and then electrospark-depositing a second material into the first material from a second electrode comprising another element such as another rare earth, an absorber, or a second metal substrate 30" base element (e.g., Zr, Fe, or Ni). It is intended that such an addition of a second material enhances certain properties of the resultant coating 20 over the first material (e.g., to facilitate bonding of the coating 20 to the second metal substrate 30" or to further improve neutronic performance). The bonding of the coating 20 to the second metal substrate 30" may be accomplished by hot pressing, hot rolling, cold or hot high deformation rate processing (e.g., explosive bonding), or combinations thereof.

The second embodiment would be useful in applications whereby it is advantageous for the coating 20 not to be exposed to the environment (e.g., as a fuel assembly component). An attractive feature of the embodiment of FIG. 2b is that if the first metal substrate 30' and second metal substrate 30" represent materials already certified for a specific environment (e.g., a light water reactor), the structure 10 does not introduce new materials directly to the environment that could pose corrosion, pressure drop, and other safety-related problems. Most importantly, the structure 10, as shown in FIG. 2b, has high structural integrity. No significant flaws are introduced in the coating 20 and the rare earth, absorber, or second metal substrate 30" base element is immobile within the structure 10. There is also a significant cost savings in minimizing the amount of qualification and certification of such a new structure 10 for nuclear use. Furthermore, if the coating 20 could be incorporated early in the fuel assembly manufacturing process, fabrication of assemblies potentially could proceed with minor additional considerations (e.g. welds and heat affected zones, non-destructive evaluation for absorber assay).

Figure 2C:
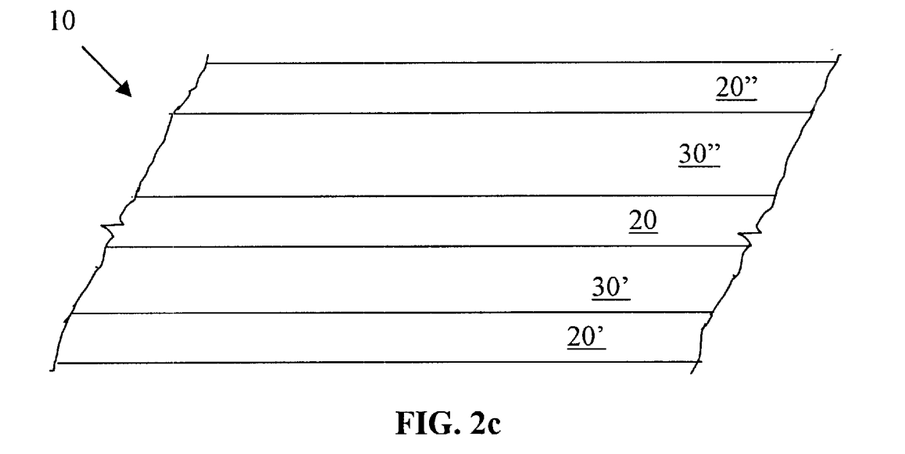
FIG. 2c is an illustration of the third embodiment of the invention.

The third embodiment of the invention, shown in FIG. 2c, provides an example of one of the numerous combinations of metal substrates and coatings that builds upon the second embodiment of FIG. 2b. In this embodiment, the structure 10 is a five-layer laminate consisting of first and second metal substrates 30', 30" and three coatings 20, 20', and 20". The coatings 20' and 20" have the same compositional limits as the coating 20 of the first two embodiments and are formed on the respective metal substrates in the same manner as the coating 20 in the first two embodiments.

EXAMPLE 1

Example 1 herein illustrates the failure of the prior art which the present invention is intended to improve. As described below, attempts were made to form a laminate, without electrospark deposition, using Er foil sandwiched between two Zircaloy-4 (Zr-4) sheets, similar to the approach of patent '826. This approach proved unsuccessful and highlighted the need for a new and different approach (provided herein as the present invention, exemplified by Example 2 below).

The Er foils were 0.01 cm thick and 5 cm square, with a reported purity of 99.9%. The fully-annealed Zr-4 sheets had a nominal thickness of 0.25 cm, a width of 20 cm and a length of 244 cm. The chemistry of the Zr-4 sheet was within the specification limits as described in ASTM Standard B 352-79.

Prior to fabricating the laminates, the Zr-4 sheet was sheared into substrates approximately 5 cm square. The Er foils were packed and shipped from the supplier under inert gas. They were removed from the packaging immediately prior to lamination to minimize oxidation. Some of the Er foils were cut into four smaller pieces, approximately 2.5 cm square, while other laminates were fabricated with full 5 cm square foils.

Initial attempts at cold roll bonding Zr-4/Er/Zr-4 laminates were unsuccessful. Hot roll bonding initially was not attempted due to concerns over the reactivity of the Er foil at high temperatures. Therefore, vacuum hot pressing was adopted as a means to simulate hot roll bonding, so that the mechanical forming characteristics of the laminates could be studied. This approach allowed an evaluation of the potential for fabricating and forming Zr-4/Er/Zr-4 laminates without the need for elaborate encapsulation or roll bonding development. A set of fabrication parameters was developed by hot pressing sheets of Zr-4 together until acceptable joints were produced. These parameters were then applied to the fabrication of hot-pressed laminates consisting of Er foil sandwiched between two Zr-4 sheets.

The Zr-4/Er/Zr-4 laminates were produced by hot pressing in vacuum at a temperature of 800° C. Applied pressures ranged from 34.5 to 48.3 MPa and pressing times ranged from 4 to 5 hours. Some of the resulting laminates were sectioned for metallography, while others were set aside for subsequent mechanical forming typically used to produce structural members (e.g., cold and/or hot rolling for BWR channel boxes). Subsequent cold or hot rolling was conducted at room temperature (RT) or 800° C. to an overall thickness reduction of 20%. Optical metallography was performed on sections of as-rolled laminates.

Figure 3A:
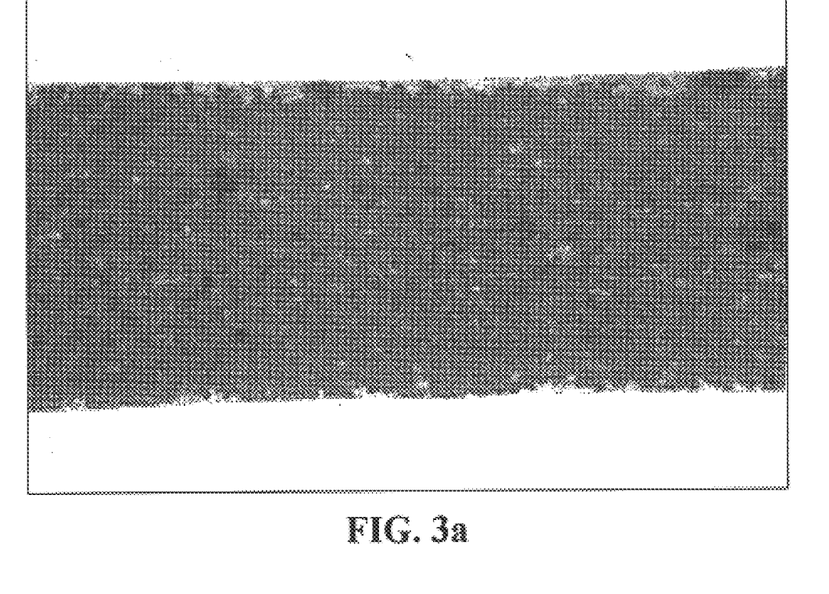
FIG. 3a is an optical micrograph (400×) of Er foil hot pressed between two Zr-4 sheets at 800° C. and 34.5 MPa for 4 Hours.

FIG. 3a shows a typical Zr-4/Er/Zr-4 laminate. The laminate was pressed at 800° C. and 34.5 MPa for 4 hours. There is some evidence of solid-state diffusion into the Er foil, forming an unidentified gray-colored phase on the Er side of the Zr-4/Er interfaces. The bond between the Er and Zr-4 appears good, with no cracks or porosity apparent.

Figure 3B:
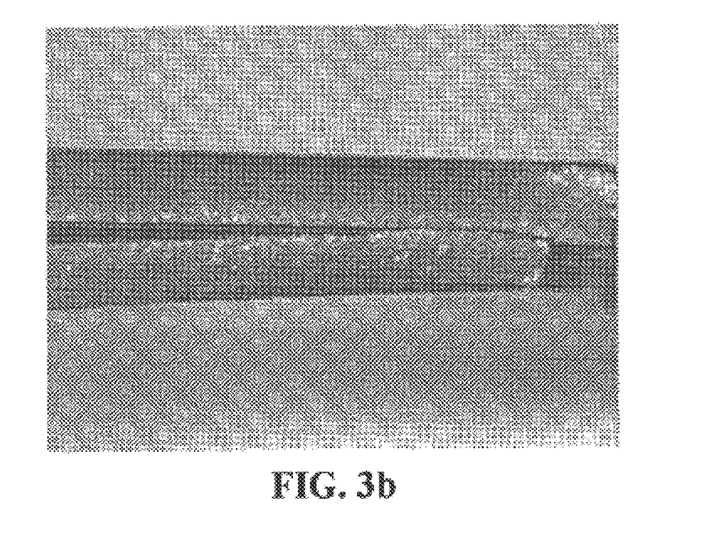
FIG. 3b is a macro photograph of a Zr-4/Er/Zr-4 laminate that failed during subsequent cold rolling.

FIG. 3b shows a laminate pressed under the same conditions as the sample shown in FIG. 3a that was then subjected to cold rolling with 20% overall reduction. The Er foil in this sample was 5 cm square, and extended to the edge of the Zr-4 sheets. The laminate split open as it exited the rollers. Close examination of the fracture surface revealed that the laminate failed within the Er, and not at one of the Er/Zr-4 interfaces.

Figure 3C:
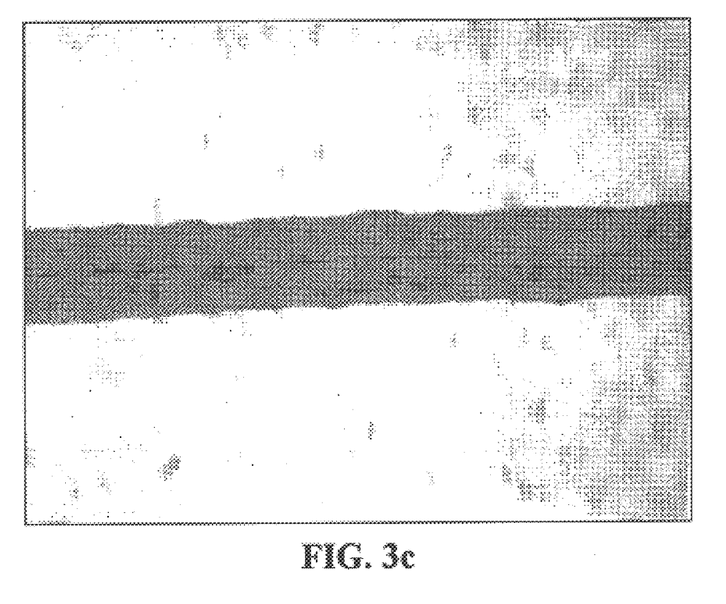
FIG. 3c is an optical micrograph (200×) of a Zr-4/Er/Zr-4 laminate that failed during subsequent cold rolling.

FIG. 3c shows a laminate fabricated by hot pressing at 800° C. and 48.3 MPa for 5 hours that was then subjected to cold rolling with 20% overall reduction. Note the cracks near the center of the Er foil. Although these did not appear to extend the entire length of the sample, there were regions that were heavily cracked. This particular sample had a 2.5 cm square piece of Er foil. This sample did not delaminate after rolling, the Zr-4 surrounding the Er probably arresting the cracks and preventing delamination. By comparing thicknesses measured from micrographs of as-pressed and as-rolled samples, the reduction in Er thickness during cold rolling was consistently between 30% and 40%.

Figure 3D:
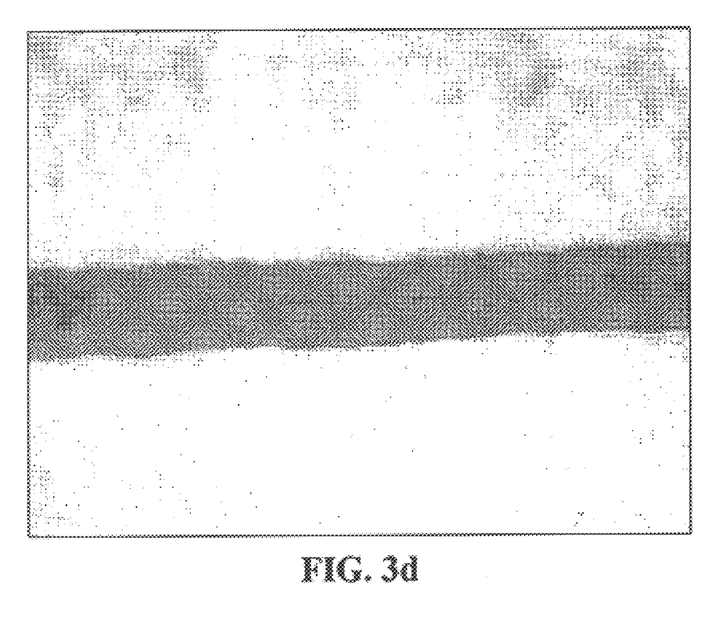
FIG. 3d is an optical micrograph (200×) of a Zr-4/Er/Zr-4 laminate that failed during subsequent hot rolling.

FIG. 3d shows a laminate fabricated by hot pressing at 800° C. and 48.3 MPa for 5 hours that was then subjected to hot rolling at 800° C. to 20% overall reduction. Like the sample in FIG. 3c, this sample was fabricated with a 2.5 cm square piece of Er foil sandwiched between two 5 cm square sheets of Zr-4. Cracks are apparent near the center of the Er foil, although they are not quite as extensive as those induced during cold rolling (FIG. 3c). However, the estimated Er thickness reduction in the hot-rolled sample is between 35% and 40%, which is comparable to the reduction observed in the cold rolled samples.

The results of Example 1 can be explained by reviewing the mechanical properties of Er and Zr-4. The mill certification for the Zr-4 sheet listed its yield strength in the longitudinal direction as 390 MPa and 151 MPa at room temperature (RT) and 288° C., respectively. The reported elongation of the Zr-4 sheet in the longitudinal direction was 29% and 49% at RT and 288° C., respectively. Literature data on the strength and ductility of Er metal are scarce, but most of the available sources appear to agree with one another reasonably well. Gschneidner reports (Gschneidner, KA. 1961. Rare Earth Alloys. Princeton, N.J.: D. van Nostrand Company, Inc.) the yield strength of cast Er to be 291 MPa, 204 MPa, and 198 MPa at RT, 205° C., and 425° C., respectively. The elongation of cast Er is reported to be 4.0%, 5.5%, and 6.8% at RT, 205° C., and 425° C. respectively. Gschneidner also reports the yield strength of forged Er to be 292 MPa, 316 MPa, and 131 MPa at RT, 205° C., and 425° C., respectively. The elongation of forged Er is reported to be 7.0%, 4.6%, and 4.6% at RT, 205° C., and 425° C., respectively. Love and Kirkpatrick report (Love, B. and C. Kirkpatrick. 1961. "Mechanical Properties of Rare Earth Metals," in Rare Earth Research, Ed. E.V. Kleber, New York, N.Y.: The Macmillan Company) the yield strength of cast Er to be 267 MPa, 239 MPa, and 173 MPa at RT, 204° C., and 427° C., respectively. They report the elongation of cast Er to be 4.0%, 5.5% and 6.7% at RT, 204° C. and 427° C., respectively. These authors also report the yield strength of wrought (swaged) Er cold worked and hot worked from 20% to 68% reduction in area. The RT yield strength of these samples ranged from 231 MPa to 348 MPa, with RT elongation ranging from 1% to 6%.

From the foregoing, the yield strength of Zr-4 is approximately 38% higher than either cast or forged Er at room temperature. This difference probably explains the difference between the 20% overall cold work in the cold rolled laminates and the 30% to 40% cold work observed in the Er foil itself. Also, the elongation of Zr-4 is 4 to 7 times greater than Er metal at room temperature. This difference explains the presence of the cracks in the Er foil, since the material could not accommodate the observed 30% to 40% thickness reduction without failing. No literature data are available for the mechanical properties of Er at 800° C., but based on the metallographic results, it appears similar arguments could be made at these temperatures. Based on the observed 35% to 40% reduction in thickness during hot rolling, it appears the differential strength between Zr-4 and Er is comparable at 800° C. and RT. The fact that fewer cracks are observed at 800° C. may indicate that the ductility of Er at these temperatures is improved, although not enough to accommodate the measured reduction in thickness.

Based on these results, it appeared that laminates of Er and Zr-4 (and other zirconium-based alloys such as Zircaloy-2) could be successfully fabricated by hot pressing, however, these laminates could not subsequently be cold rolled or hot rolled to an overall thickness reduction of 20% due to failures in the Er. Further, it was unlikely that hot roll bonding would successfully produce a well-bonded and undamaged laminate using Er foil. The cause of the failures appears to be the difference in strength and ductility between the Zr-4 sheet and the Er metal. Therefore, it appeared that this approach to producing Zr4/Er/Zr-4 laminates for structural members in fuel assemblies was not feasible (and possibly why patent '826 did not disclose Er as a candidate material for that application).

EXAMPLE 2

The creation of a Zr-4/Er/Zr-4 laminate that could sustain subsequent mechanical working without inducing flaws, such as cracks or delaminations, proved to be a challenging fabrication task. As illustrated in Example 1, the wide disparity in mechanical properties between the zirconium (Zr) alloy and Er foil resulted in laminar cracking and separation in the Er layer. Consequently, various coating processes were considered as a first step in forming a laminate, especially those processes that could form a strong metallurgical bond between the coating and substrate. It was believed that by first layering Er on a substrate and then sandwiching the Er layer between another substrate, a satisfactory laminate could be formed. Coating processes such as thermal spray processes (e.g., plasma spray) and vacuum processes (e.g. sputtering, electron beam evaporation, ion coating) were considered as a first step in forming but were expected to be unacceptable due to being expensive or impractical for the geometries of substrates expected, or not providing an Er layer that would maintain integrity throughout its thickness during subsequent mechanical working. Laser cladding by rastering a laser over the surface of an Er powder dispersed on a Zr-4 substrate was also considered due to the strong metallurgical bonds it can create. The high capital equipment expense, however, prevented development of this technique.

Based on electrospark-deposition (ESD) effectively and economically creating extremely hard, robust, and galling-resistant coatings for reactor components (U.S. Pat. No. 4,649,086), this coating technique was selected as a candidate for producing a satisfactory Zr-4/Er/Zr-4 laminate. The ESD process (Johnson RN, "Principles and Applications of Electro-Spark Deposition," Proceedings of the $1^{st}$ International Conference on Surface Modification Technology, Phoenix, Ariz., Jan. 25–28, 1988) uses very short duration (i.e., a few microseconds) pulses to remove material from a metallic or cermet electrode in a plasma arc and to deposit it on a conductive metallic or cermet substrate. The time between pulses is on the order of a millisecond, which allows a relatively long cooling time between pulses and results in rapid solidification of the deposit and low heat input to the substrate. The rapid solidification typically produces exceptionally fine-grained or nano-structured deposits that exhibit unusually good wear and corrosion properties.

The ESD process creates some of the most robust and damage-resistant coatings known. Advantages include the ability to produce highly robust coatings with little heat input and without the use of expensive vacuum chambers or sound-control booths. The process is environmentally benign in that it produces no hazardous wastes, fumes, or effluents. Capital equipment costs are low, and the process is portable for use in the field, lab, shop, or production floor. ESD, however, does involve a large number of process parameters that must be controlled for consistent performance.

The ESD process lends itself well to automation and controlled placement. Further, the technique can be easily adapted to provide coatings of different compositions or thicknesses at different locations on the substrate material. This could provide a significant neutronic performance advantage by tailoring the amount of absorber material at different radial and/or axial positions in the reactor core to optimize the flux profile.

Two significant modifications to traditional ESD coating were developed to produce satisfactory Er coatings on Zr-4.

The first was adapting the technique to use square cross-section electrodes because the supplier of the Er rods was unable to produce a round cross-section rod with the desired dimensions. The second modification was adapting the technique to produce coatings under an inert cover gas rather than in air. As discussed previously, ESD is essentially a type of pulsed arc welding, and relatively high temperatures are reached when the arc is repeatedly struck between the electrode and the substrate. Metallography of Er coatings produced in air suggested that significant oxidation occurred in the highly reactive Er, which led to embrittlement and cracking upon cooling. With an inert cover gas, Er coatings up to 75 μm thick were successfully produced in a single pass. Metallography of these coatings revealed excellent coverage with no cracks, good uniformity in thickness, and a relatively smooth surface. Thicker coatings were produced by producing Er layers in successive passes. Coatings up to 150 μm thick, produced in 3 passes, were successfully fabricated. Like the single pass coatings, the multiple pass coatings had no cracks, and exhibited acceptable uniformity, surface roughness, and layer-to-layer bonding. The combined deposition rate, thickness, and uniformity associated with these Er coatings have never been achieved with any other material; typical ESD coatings are deposited at about 10 μm per pass and many coatings crack at thicknesses greater than about 25 μm.

ESD operating parameters that are important to achieving acceptable coatings include spark energy, duration, voltage, current, capacitance, frequency, environment, substrate temperature, contact pressure, electrode speed relative to the substrate, electrode motion, geometry of electrode contact, and substrate and electrode composition. Several combinations of parameters were found that achieved acceptable coatings at a rate of about 5 mg/min (~5 microns thickness at a coverage rate of 1 $cm^2$/min). Thicker coatings were produced through multiple passes. However, by continued experimentation with process parameters, a set of conditions that produced more than an order of magnitude increase in deposition rates was unexpectedly found. Er coatings of 75 microns thick on Zr-4 substrates were produced in each pass, for a deposition rate of about 70 mg/min. The specific ESD operating parameters for producing Er coatings included careful control of the argon gas environment and are listed below in Table 1.

TABLE 1

Deposition Parameters for Applying Erbium Using ESD

| | |
|---|---|
| Spark Duration: | 5 to 50 microseconds (this is a characteristic of the power supply used) |
| Voltage: | 50 to 200 volts (160 volts is preferred for high deposition rates) |
| Current: | 1.5 to 8 amps (3 amps is preferred) |
| Capacitance: | 10 to 60 mfd (40 mfd is preferred) |
| Frequency: | 100 to 1500 Hz (500 Hz is preferred) |
| Environment: | Any inert gas (Argon is preferred because it is inexpensive and ionizes well) |
| Substrate Temperature: | RT to 200° C. (RT is preferred) |
| Electrode/Substrate Contact Pressure: | 5 to 125 gram force (30 gram force is preferred) |
| Electrode Speed Relative to Substrate: | 0.25 to 5 cm per second (1.25 cm per second is preferred) |
| Electrode Motion: | Rotating, oscillating, or vibrating (rotating at 200 rpm is preferred) |
| Geometry of Electrode Contact: | Perpendicular to substrate surface to 15 degrees from perpendicular (7 degrees from perpendicular is preferred) |
| Substrate composition: | Any metal (zirconium alloy is preferred, Zr-4 is most preferred) |

TABLE 1-continued

Deposition Parameters for Applying Erbium Using ESD

| | |
|---|---|
| Electrode composition: | Er/Zr alloy (pure Er is preferred) |
| Step-over distance (distance moved after 1 traverse with the electrode to lay another bead next to the 1$^{st}$ bead): | .05 to .5 mm (.05–.08 mm is preferred) |

The electrodes used for ESD were Er rods nominally 0.32 cm square and 15 cm long, with a reported purity of 99.9%. Rod density in the first batch ranged from 88.8% to 91.2% of theoretical (9.05 g/$cm^3$). The second batch ranged from 88.3% to 93.5% of theoretical density.

A variety of Er coatings were first applied to Zr-4 sheets approximately 5 cm square. Furthermore, some of these Er coatings were subsequently coated with Zr (i.e., a Zr "overcoat") to investigate whether this dual coating composition would improve the structural integrity of the later-formed laminate. The Zr electrodes used for overcoating were fabricated from 1 mm diameter annealed Zr wire having 99.2% purity.

Figure 4A:
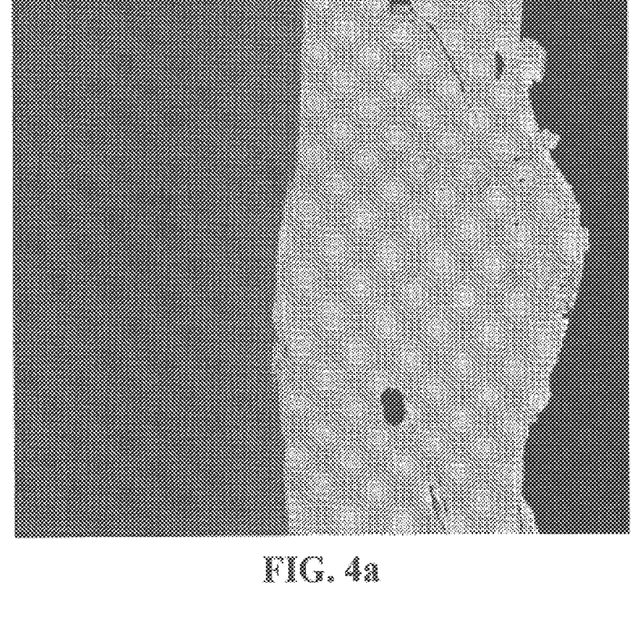
FIG. 4a is a scanning electron micrograph of an electrospark-deposited Er coating with a nominal thickness of 55 $\mu$m.
Figure 4B:
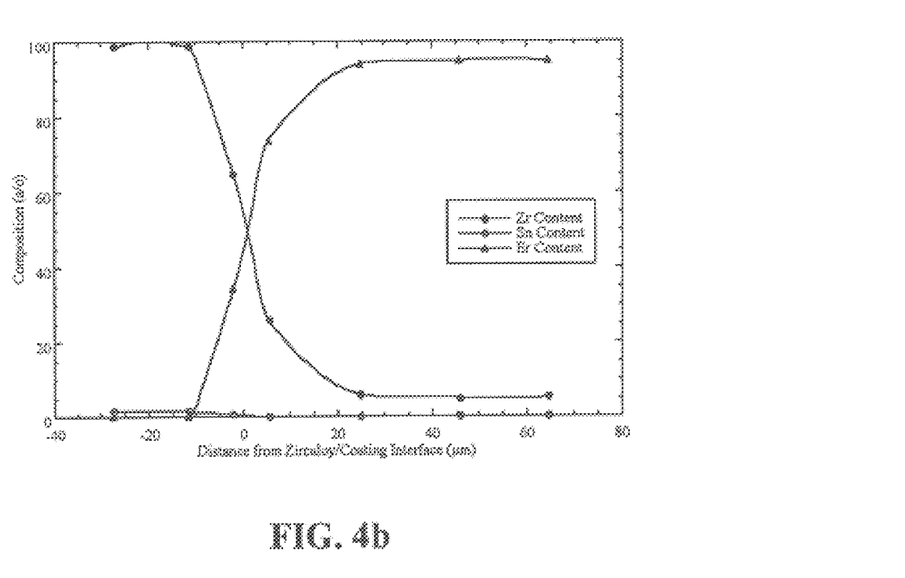
Figure 4C:
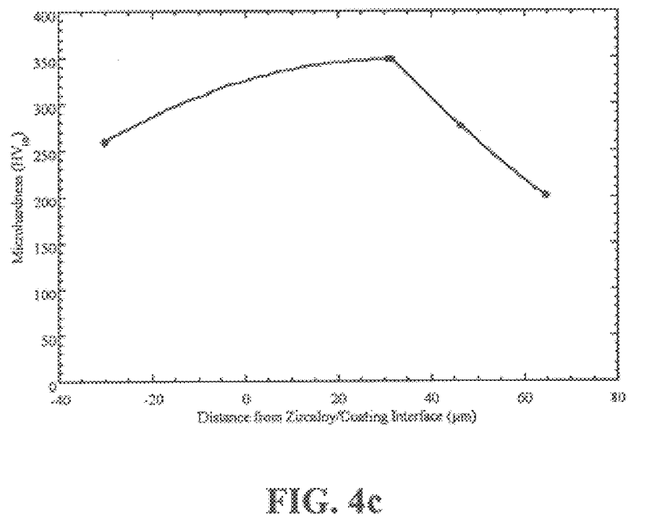

FIG. 4a depicts a typical ESD Er coating with a nominal thickness of approximately 55 μm. The image in FIG. 4a was obtained with a scanning electron microscope in back-scattered electron mode to highlight composition contrast. Note the sharp coating/substrate interface and the relative uniformity of the coating composition. There is some contrast at the surface of the coating that may be an oxide film produced during or after coating. Also visible in FIG. 4a are several Vickers microhardness indentations. Note that except for the one closest to the coating surface, there is no evidence of cracks emanating from the indentations, suggesting a degree of toughness in the coating. The brittle nature of the indentation nearest the surface probably can be attributed to a surface effect or an oxide film. The porous areas in the coating are most likely the result of inhomogeneities in the Er rods used as ESD electrodes. FIG. 4b shows Zr, Sn and Er energy dispersive x-ray spectroscopic (EDS) composition profiles across the thickness of the coating depicted in FIG. 4a. Note the steep compositional gradients at the coating/substrate interface and the relative uniformity of the coating composition (Er with approximately 5 a/o Zr). Interestingly, this coating composition was found to be common to all the Er coatings independent of their thickness or process parameters. FIG. 4c shows the Vickers microhardness profile corresponding to the indentations in FIG. 4a. The hardness across most of the coating thickness is equal to, or greater than, the hardness of the zircaloy substrate. This suggests the ultimate tensile strength of the coating is comparable to, or greater than, the strength of the substrate, which bodes well for subsequent mechanical processing.

Figure 5A:
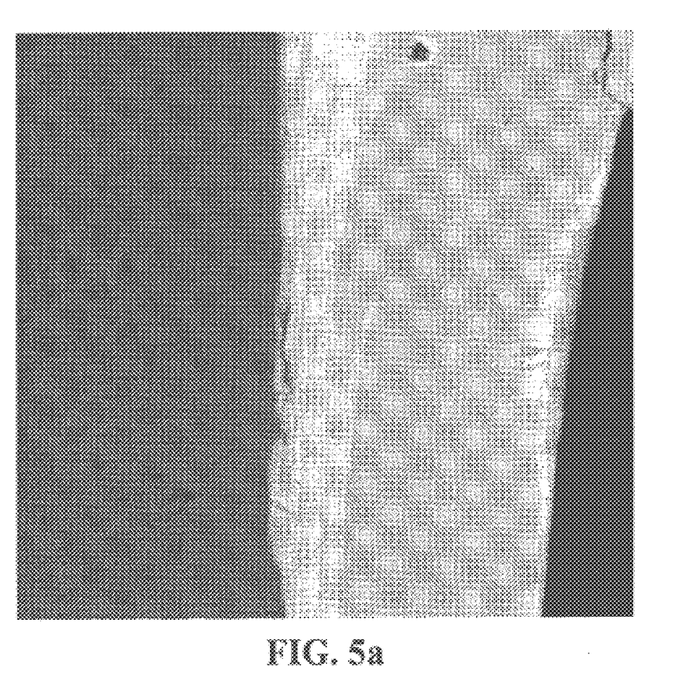
FIG. 5a is a scanning electron micrograph of a Zr-overcoated Er coating with a nominal thickness of 17 $\mu$m.
Figure 5B:
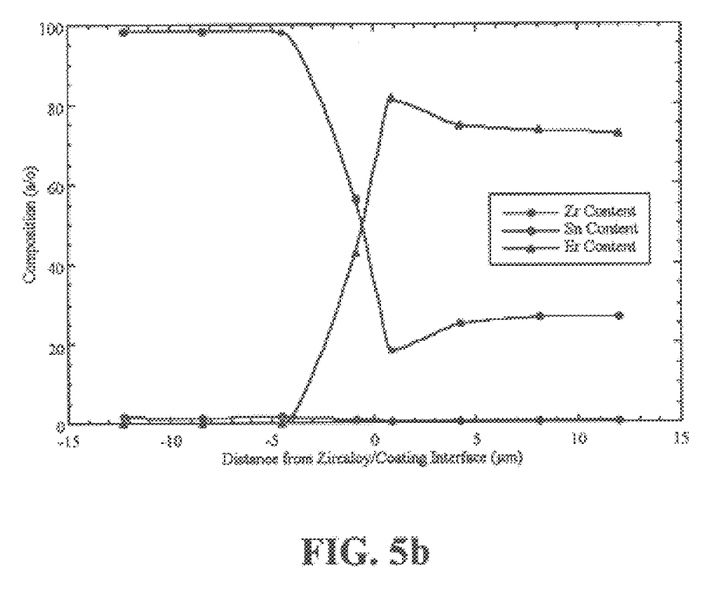

FIG. 5a shows a typical ESD Zr-overcoated Er coating with a nominal thickness of approximately 17 μm. As with the Er coating shown in FIG. 4a, there is a sharp coating/substrate interface and relatively uniform composition throughout the coating (as indicated by the lack of visual contrast in the back-scattered electron image shown in FIG. 5a). Also, the surface appears relatively free of distinct phases (i.e. oxide films). FIG. 5b depicts an ESD composition profile across the thickness of the coating in FIG. 5a. In general, it is very similar to the profile shown in FIG. 4b for the Er coating, in that it has a steep compositional gradient at the coating/substrate interface and a relatively constant composition across the thickness of the coating. However, the Zr content of the coating is approximately 25 a/o in this case due to the Zr overcoat at the Er surface (the dual Zr content gradient is apparent from the minimum in Zr concentration shown in FIG. 5b). As with the Er coatings, the Zr content of the coating is essentially independent of Er or Zr overcoat thickness and process parameters.

The Zr-Er phase diagram suggests that both the Er and the Zr-overcoated coatings should exist as a two-phase mixture of α-Zr and Er. The microstructural evidence suggests that this mixture is uniformly distributed and of relatively fine scale. The insensitivity of the coating composition profiles to thickness and process parameters suggests these coatings would lend themselves to good process control and repeatability in a commercial setting. Further, the ability to tailor the Er concentration by Zr overcoating or by using a Zr—Er alloy electrode appears to offer the promise of precise incorporation of the desired amounts of rare earth in the final product. Coupled with the inherent capability of the ESD technique to accurately place the coating material on the zircaloy substrate, it appears this approach offers a very flexible method for incorporating the desired amount of rare earth in exactly the desired locations.

Laminates having 3-layers were formed by pairing Er-coated, Zr-overcoated Er, or uncoated ("bare") Zr-4 substrates with Er-coated or Zr-overcoated Er substrates such that the coatings formed the inner layer and the substrates formed the outer layers of the laminate. Prior to this layering in preparation for bonding, any bare Zr-4 surface to be bonded was sanded with 400 grit SiC paper (grit blasting would also be acceptable). All surfaces to be bonded were then swabbed with B-etch solution for several minutes to remove any oxide film and rinsed with water to remove any residual solution. After surface preparation, the laminates were rapidly transported to an inert gas or vacuum environment to prevent oxide formation on the surfaces to be bonded. To prevent oxide formation during the bonding process, the laminates were seal-welded along the periphery of the laminates using either the tungsten inert gas (TIG) method under He or the electron beam (EB) method under vacuum. The laminates were then subjected to hot roll bonding in air to simulate the expected mechanical processing required in a commercial manufacturing operation.

Figure 6:
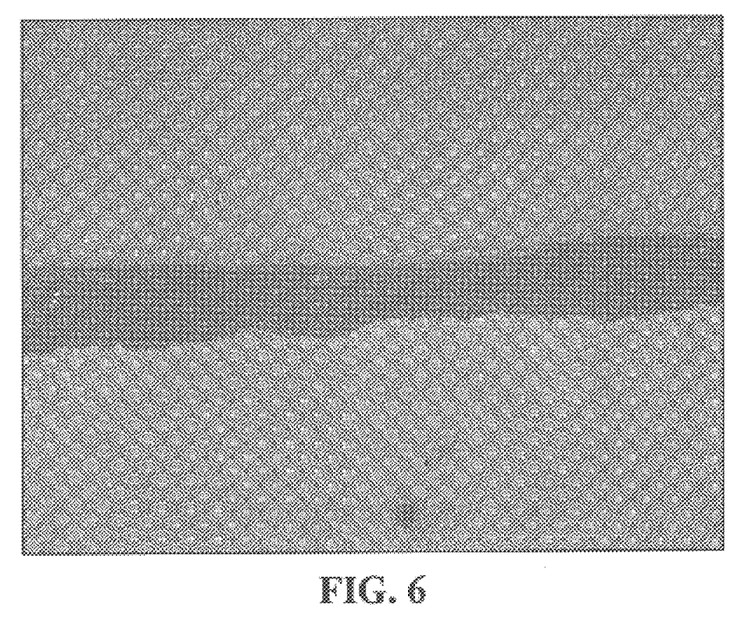
FIG. 6 is an optical micrograph (200×) of a laminate produced by hot roll bonding after TIG welding under He.

Laminates were hot roll bonded at 800° C. at overall thickness reductions of 10% to 20%. The bonded laminates were subsequently annealed in air at 800° C. for at least 30 minutes to relieve the induced stresses and to recrystallize the Zr-4. The best results were obtained with either Er or Zr-overcoated Er laminates bonded with uncoated Zr-4 substrates. FIG. 6 shows a bonded Zr-4/Er/Zr-4 laminate made by TIG seal welding and then hot roll bonding an Er-coated substrate to an uncoated Zr-4 substrate. Similar results were obtained by hot roll bonding a Zr-overcoated Er-coated coupon with an uncoated Zr-4 substrate. Attempts to hot roll bond two Er-coated and two Zr-overcoated Er-coated laminates to each other were unsuccessful. The lack of bonding was presumably related to the presence of an oxide film on the coated surfaces.

Figure 7:
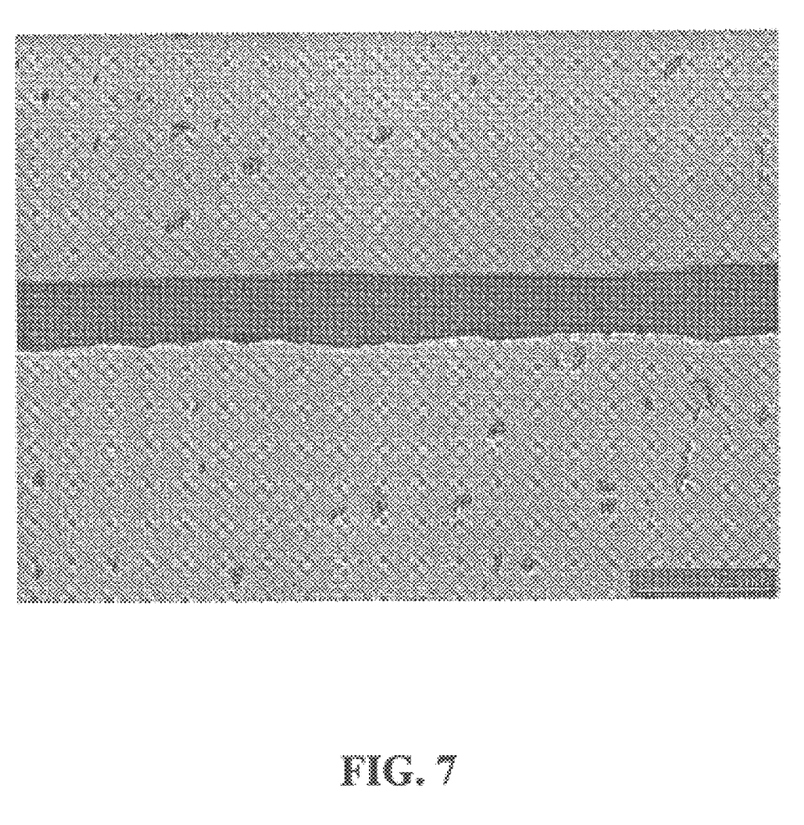
FIG. 7 is an optical micrograph (220×) of a laminate produced by hot roll bonding after EB welding under vacuum.

TIG seal welding of the laminates under He prior to hot roll bonding, however, prevented complete bonding during hot rolling. A better seal welding/bonding technique would eliminate trapping of any He between the laminations during hot rolling. EB welding or TIG welding in He whereby the He can be removed during hot rolling through a vent tube are considered viable approaches. For example, laminates were successfully EB welded and hot-rolled bonded when the laminates were inserted into a dessicator and evacuated to a $10^{-6}$ torr (or better) vacuum within 10 to 15 minutes after the sanding and/or etching surface preparation described above. These laminates displayed complete bonding across the width of the laminates, with no evidence of failures in the coating induced during hot rolling. FIG. 7 shows a typical micrograph of a bonded Zr-4/Er/Zr-4 laminate made by EB seal welding and then hot roll bonding an Er-coated substrate to an uncoated Zr-4 substrate.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making a laminated structure, comprising the steps of:
   (a) providing a first metal substrate;
   (b) forming a coating on the first metal substrate by the process of electrospark-depositing so as to metallurgically bond the coating to the first metal substrate, wherein a first electrode comprises a rare earth material; and
   (c) metallurgically bonding a second metal substrate to said coating.

2. The method as recited in claim 1, wherein said first and second metal substrates are selected from the group consisting of zirconium-based alloys, iron-based alloys, and nickel-based alloys.

3. The method as recited in claim 2, wherein said first and second metal substrates are selected from the group consisting of Zr—Sn, Zr—Nb, and Zr—Sn—Nb alloys.

4. The method as recited in claim 3, wherein said first and second metal substrates are selected from the group consisting of UNS R60802, UNS R60804, and UNS R60901.

5. The method as recited in claim 1, wherein said at least one rare earth contains erbium.

6. The method as recited in claim 1, wherein said first electrode consists essentially of a rare earth.

7. The method as recited in claim 6, wherein said rare earth is erbium.

8. The method as recited in claim 1, further comprising the step of electrospark-depositing a second material onto said first material from a second electrode comprising an absorber.

9. The method as recited in claim 1, further comprising the step of electrospark-depositing a second material onto said first material from a second electrode comprising a base element of said second metal substrate.

10. The method as recited in claim 1, further comprising the step of electrospark-depositing a second material onto said first material from a second electrode comprising at least one rare earth.

11. The method as recited in claim 1, wherein said metallurgical bonding is performed by a process selected from the group consisting of hot rolling, hot pressing, high deformation rate processing, and combinations thereof.

12. The method as recited in claim 1, wherein said laminated structure is a component of a nuclear fuel assembly.

13. The method as recited in claim 12, wherein said nuclear fuel assembly is used in a nuclear reactor selected from the group consisting of boiling water reactors and pressurized water reactors.

14. The method as recited in claim 13, wherein said component is a channel in a boiling water reactor fuel assembly.

15. The method as recited in claim 1, wherein said laminated structure is a component of a fissile material storage container.

16. The method as recited in claim 1, wherein the process of electrospark depositing comprises the step of rotating said first electrode while rastering said first electrode across said first metal substrate while depositing said first material onto said first metal substrate from said first electrode through a plasma arc.

* * * * *